United States Patent
Dodwell et al.

(10) Patent No.: US 11,586,950 B2
(45) Date of Patent: Feb. 21, 2023

(54) METHODS, SYSTEMS, AND DEVICES FOR DETECTING AND MITIGATING POTENTIAL BIAS

(71) Applicant: AT&T Intellectual Property I, L.P., Atlanta, GA (US)

(72) Inventors: Emily Dodwell, Jersey City, NJ (US); Balachander Krishnamurthy, New York, NY (US); Ritwik Mitra, Trenton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 488 days.

(21) Appl. No.: 16/705,520

(22) Filed: Dec. 6, 2019

(65) Prior Publication Data
US 2021/0174223 A1 Jun. 10, 2021

(51) Int. Cl.
*G06F 15/16* (2006.01)
*G06N 5/04* (2023.01)
*G06Q 30/0241* (2023.01)
*G06N 20/00* (2019.01)

(52) U.S. Cl.
CPC ............... *G06N 5/04* (2013.01); *G06N 20/00* (2019.01); *G06Q 30/0277* (2013.01)

(58) Field of Classification Search
CPC ............ G06N 4/04; G06N 20/00; G06N 5/04; G06Q 30/0277
USPC ................................................ 706/10–12, 14
See application file for complete search history.

(56) References Cited

U.S. PATENT DOCUMENTS

| | | | |
|---|---|---|---|
| 2002/0016640 A1* | 2/2002 | Gagne | G05B 13/042 700/29 |
| 2010/0027418 A1* | 2/2010 | Rodrig | H04L 45/70 709/227 |
| 2014/0321849 A1* | 10/2014 | Katagiri | H04J 14/0201 398/45 |
| 2019/0147372 A1* | 5/2019 | Luo | G06N 20/00 706/20 |
| 2022/0245036 A1* | 8/2022 | Azaria | G06N 5/04 |

* cited by examiner

Primary Examiner — Bharat Barot
(74) Attorney, Agent, or Firm — Guntin & Gust, PLC; Atanu Das

(57) ABSTRACT

Aspects of the disclosure include, for example, obtaining input data. Further embodiments include a determination of a fast path prediction for a first time period according to the input data based on a fast path model. Embodiments include providing instructions to deliver information to a user device according to the fast path prediction. Additional embodiments include obtaining additional input data. Embodiments include a determination of a slow path prediction for the first time period according to the input data and the additional input data based on a slow path model, retraining the fast path model according to the input data and the fast path prediction, and training the slow path model according to the slow path prediction. Embodiments include a determination of a fast path negative impact metric and determination of a slow path negative impact metric. Other embodiments are disclosed.

20 Claims, 8 Drawing Sheets

250

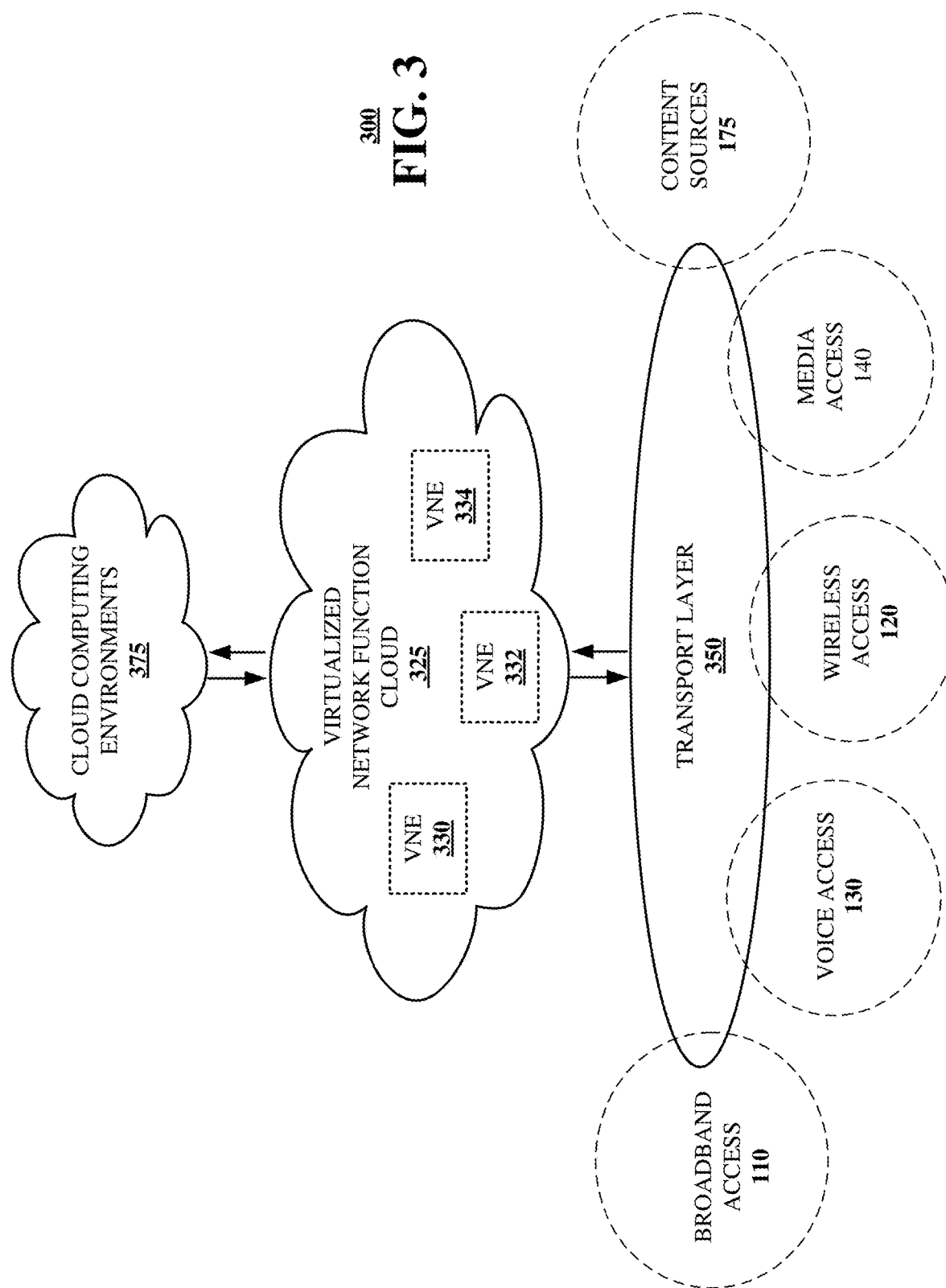

METHODS, SYSTEMS, AND DEVICES FOR DETECTING AND MITIGATING POTENTIAL BIAS

FIELD OF THE DISCLOSURE

The subject disclosure relates to methods, system, and devices for detecting and mitigating potential bias.

BACKGROUND

Generally, Internet content, such as an advertisement, can be provided without fully taking into account all of the context in which it is placed. That is, instantaneous optimization in placing Internet content, such as an advertisement, often leads to sub-optimal outcomes in the long run when additional information that would provide contextual nuance are necessarily omitted for speed. For example, a user's cookies about the user's browsing behavior, age, device type, and location may be included in determining whether to place an advertisement on a website, but bias may exist on the basis of gender, which if not considered, may result in a sub-optimal placement of the advertisement.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
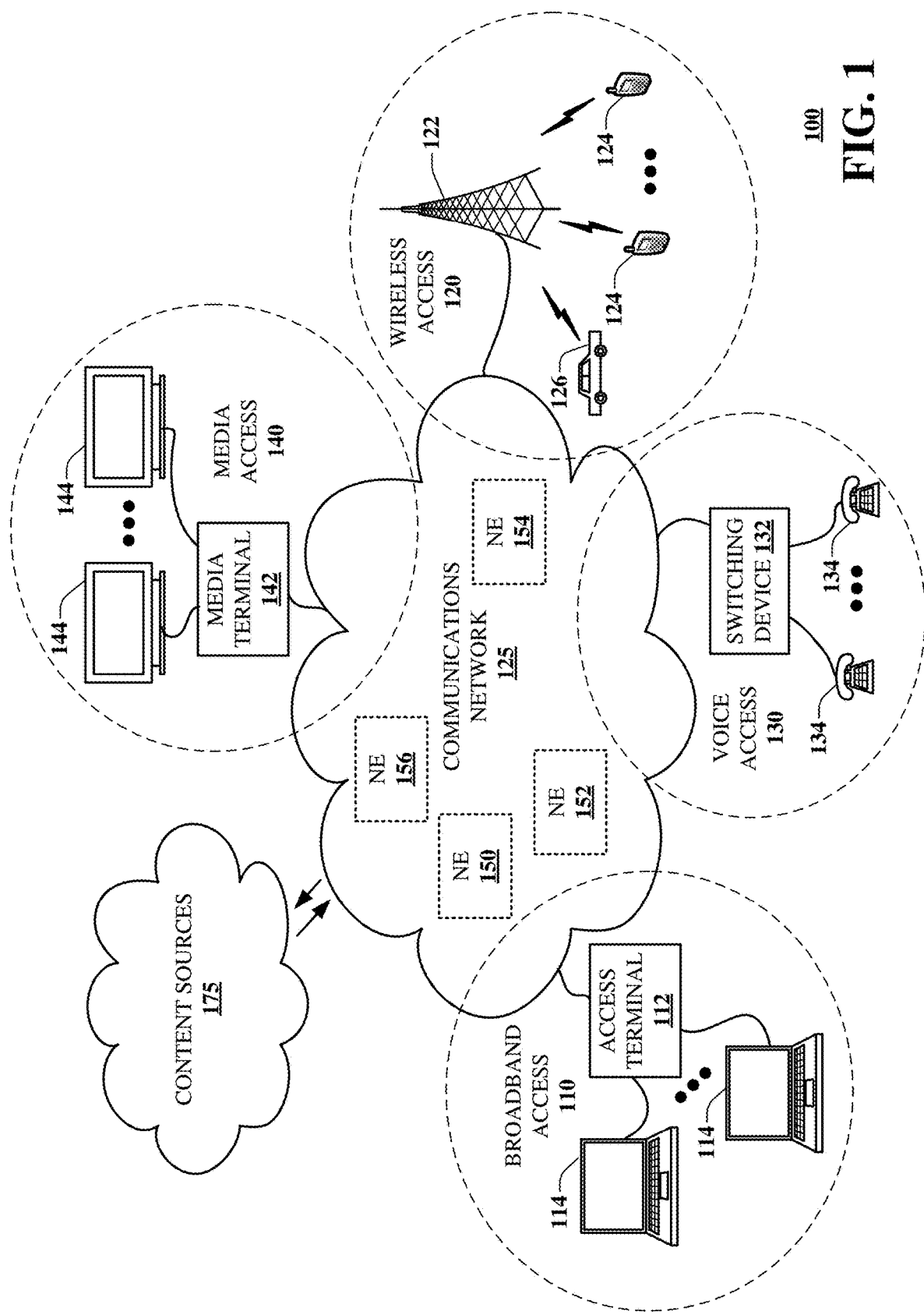
FIG. 1 is a block diagram illustrating an exemplary, non-limiting embodiment of a communications network in accordance with various aspects described herein.

The subject disclosure describes, among other things, illustrative embodiments for obtaining input data. Further embodiments can include a determination of a fast path prediction for a first time period according to the input data based on a fast path model. In addition, embodiments can include providing instructions to deliver information to a first user device according to the fast path prediction. Also, embodiments can include obtaining additional input data. Further embodiments can include a determination of a slow path prediction for the first time period according to the same fast path input data and additional input data based on a slow path model. Additional embodiments include retraining the fast path model at the end of the first time period's deployment using the input and predictions deployed on the first time period (time period 0) and training the slow path model according to the slow path prediction. In some embodiments, retraining of the slow path model at the end of a specific time period's deployment can also be based on the input data and predictions from all preceding time periods as well as all the additional input data available up to that point. Further embodiments include determining a fast path negative impact metric according to the retrained fast path model and slow path negative impact metric according to the retrained slow path model. A negative impact metric can be a measure (e.g., a numeric score) of negative impact of providing information such as, but not limited to, posting an inappropriate advertisement for a particular website, for example. Other embodiments are described in the subject disclosure.

One or more aspects of the subject disclosure include a device, comprising a processing system including a processor, and a memory that stores executable instructions that, when executed by the processing system, facilitate performance of operations. The operations can comprise obtaining input data. Further operations can include a determination of a fast path prediction for a first time period according to the input data based on a fast path model. In addition, operations can include providing instructions to deliver information to a first user device according to the fast path prediction. Also, operations can comprise obtaining additional input data. Further, operations can include a determination of a slow path prediction for the first time period according to the same fast path input data and the additional input data based on a slow path model. Additional operations can comprise retraining the fast path model at the end of the first time period's deployment using the input data and predictions deployed on the first time period (time period 0) and the operations can include training the slow path model according to the slow path prediction. In some embodiments, operations can include retraining of the slow path model at the end of a specific time period's deployment, which can also be based on the input data and predictions from all preceding time periods as well as all the additional input data available up to that point. Also, operations can include a determination of a fast path negative impact metric according to the retrained fast path model and a determination of a slow path negative impact metric according to the retrained slow path model.

One or more aspects of the subject disclosure include a machine-readable medium, comprising executable instructions that, when executed by a processing system including a processor, facilitate performance of operations. The operations can comprise obtaining input data. Operations can include a determination to post an advertisement on a website for a first time period according to the input data based on a fast path model. The operations can include providing instructions to deliver information to a user device according to the determination to post the advertisement. Further operations can comprise obtaining additional input data. In addition, operations can include a determination not to post the advertisement on the website for the first time period according to the input data and the additional input data based on a slow path model. Also, operations can comprise retraining the fast path model at the end of the first time period's deployment using the input data and predictions deployed on the first time period (time period 0). Further, the operations can include training the slow path model according to the determination not to post the advertisement. In some embodiments, the operations can include retraining of the slow path model at the end of a specific time period's deployment, which can also be based on the input data and predictions (such as whether or not to post an advertisement) from all preceding time periods as well as all the additional input data available up to that point. Additional operations can include a determination of a fast path negative impact metric according to the retrained fast path model. Also, operations can include a determination of a slow path negative impact metric according to the retrained slow path model.

One or more aspects of the subject disclosure include a method. The method can comprise obtaining, by a processing system including a processor, input data. Further, the method can include a determination, by the processing system, of a fast path prediction for a first time period according to the input data based on a fast path model. Also, the method can include providing, by the processing system, instructions to deliver information to a user device according to the fast path prediction. In addition, the method can include obtaining, by the processing system, additional input data. Further, the method can include a determination, by the processing system, of a slow path prediction for the first time period according to the input data and the additional input data based on a slow path model. In addition, the method can include retraining, by the processing system, the fast path model at the end of the first time period's deployment using the input data and predictions deployed on the first time period (time period 0). In addition, the method can include training, by the processing system, the slow path model according to the slow path prediction. In some embodiments, the method can include retraining of the slow path model at the end of a specific time period's deployment, which can also be based on the input data and predictions from all preceding time periods as well as all the additional input data available up to that point. Also, the method can include a determination of a fast path negative impact metric according to the retrained fast path model. Further, the method can include a determination of a slow path negative impact metric according to the retrained slow path model. The method can include a determination that the fast path negative impact metric exceeds a threshold and the method can include a determination that the slow path negative impact metric does not exceed the threshold. In addition, the method can include replacing, by the processing system, the fast path model with the slow path model.

Referring now to FIG. 1, a block diagram is shown illustrating an example, non-limiting embodiment of a communications network 100 in accordance with various aspects described herein. For example, communications network 100 can facilitate in whole or in part in detecting and mitigating potential bias that includes a determination that a fast path negative impact metric based on a fast path prediction using a fast path model exceeds a threshold during a first time period, and a determination that a slow path negative impact metric based on a slow path prediction using a slow path model does not exceed the threshold during the first time period such that the slow path model replaces the fast path model during a second time period. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
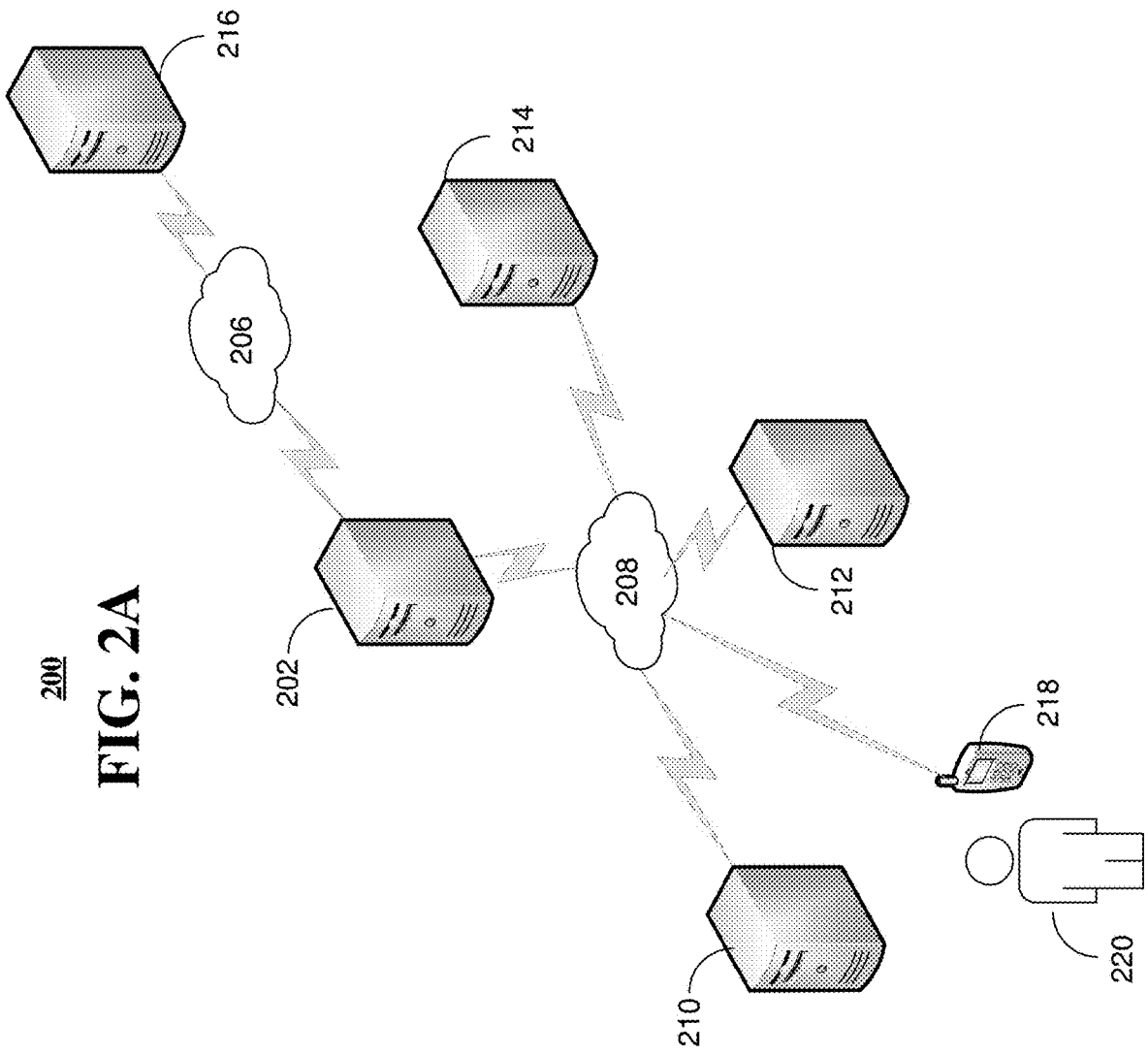
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, the system 200 can include a bias mitigation server 202 that can be communicatively coupled to an advertisement server 216 over a communication network 206. Further, the bias mitigation server 202 can be communicatively coupled to a web server 210, a social media server 212, and an employment server 214 over a communication network 208. In addition, each of the web server 210, social media server 212, and employment server 214 can be communicatively coupled to a first user device 218 associated with a first user 220 over the communication network 208. The communication networks 206, 208 can include wireless communication networks, wired communication networks, or a combination thereof. The first user device 218 can include a mobile device, mobile phone, smartphone, tablet computer, laptop computer, desktop computer, or any other computing device.

In one or more embodiments, the bias mitigation server 202 can use machine learning to detect and mitigate potential bias for various applications such as in posting advertisements on websites, automated posting of content on social media feeds of a user, selecting resumes for review by an employer, providing images captured by a security camera of a premises, and posting search results for a search engine. Modern machine learning-based decision making platforms, such as those that may be incorporated in bias mitigation server 202, are designed to process large amounts of data and make real-time decisions based on the incoming data. These decisions may often be made within a few milliseconds of receiving the data. The low-latency requirements for large volumes of data necessitate use of only a handful of highly optimized, often opaque, machine learning tools and algorithms that automate a specific decision-making task at scale. In some embodiments, the machine learning tools can include a fast path model or process. These fast path machine learning models are usually designed to optimize performance metrics that are directly tied to revenue, and they do so based on a specific set of criteria/features available from the incoming data at run time. However, as recent developments in various industries deploying such systems have suggested, instantaneous optimization often leads to sub-optimal outcomes in the long term when additional information/checks that would provide contextual nuance are necessarily omitted for speed. For example, there may be cases of unintentional biases revealed in search engine results, automated placement of ads on websites hosting questionable content, and faulty buy/sell decisions in high frequency trading, among others. The failure of detecting such issues quickly result in negative public relations, significant economic costs, and possibility of lasting brand impact. Though potential adverse outcomes are diverse and broad in range, and they may vary in scope and impact, they can be referred to collectively as potential bias, which is appropriate because while the manifestation of these problems can vary, they all result from the inability of deployed algorithms to incorporate all possible information in order to make well-rounded and nuanced decisions at runtime. However, it should be understood that, because the systems and methods in this disclosure are meant to address potential outcomes and mitigate possible risks, any reference to bias means "potential bias" and is not a conclusion of bias in the common or legal sense of the word. In some embodiments, potential bias can refer to a specific misplacement of a wrong advertisement placed on the wrong website. Bias checks are often limited to data pre-processing or outcome post-processing.

One or more embodiments can include a process to detect and mitigate a broad range of potential biases in a tailored manner. In some embodiments, fast path machine learning tools can operate as follows. Data can be streamed to a bias mitigation system 200 that can include the bias mitigation server 202, often at high speed, and decisions have to be made on further actions to be performed on the input data and direct them accordingly towards the correct processing step. Checking for potential bias, through incorporation of additional data to calculate a bias metric, for example, alone may introduce significant overhead to this process. Yet, at the same time the data is variable, and the repercussions of undetected bias may not be realized until much later at potential high cost.

One or more embodiments include a slow path model (a shadow process) that lags behind the regular machine learning process. It accepts the same input data as the fast path process and decides on machine learning based action outside of the fast path execution. Further, it accepts additional input data that allows it to compute the cost of actions taken by the fast path without considering the potential bias present in the data and/or process. The cost is computed based on the potential of negative impact due to any undetected bias. A potential negative impact could range from embarrassment to the company that uses the fast path model, to negative press reports, and all the way to potential legal liability. As an illustrative example, in the online auction-based advertising systems, the potential for negative impact might be an advertiser's concern regarding placement of its advertisements on particular brand-unsafe websites. For this specific example, the cost calculation of potential bias could also include other elements such as Total Quality Metric of a website, the number of users that are likely to visit the site or view the specific advertisement, etc.

The bias mitigation server 202 then computes a potential bias score either in numeric form or in another form, such as labeling including "risky," "moderately risky," or "safe." After such labeling, the machine learning model would be retrained (again outside the fast path) to reduce the future risk of input that was labeled as "risky." It would also set a flag for future checks for input labeled as "moderately risky." Embodiments can be independent of the machine learning models, the data, or any possible bias detection or mitigation technique. It can be between offline detection and online detection using external variable inputs as parameters to inform whether a model needs to be retrained when input deemed as risky is recognized. The process factors the cost of a label to minimize both the risk of negative impact and the potential of lost revenue.

In one or more embodiments, the bias mitigation server 202 can receive an advertisement from an advertisement server 216 over the communication network 206 while also receiving input data in the form of bids from one or more web servers including web server 210 to post the advertisement on websites that are hosted by the web servers. Further, the bias mitigation server 202 can implement a fast path model during a first time period (e.g., day, portion of a day, hour, etc.) to determine which web server/website to post the advertisement on according to the input data (bids) based on the fast path model. As a result, the fast path model may choose to provide the advertisement to the web server 210 to present on its website based on it giving the highest bid. The web server 210 can provide web site content including the advertisement to a first user device 218 associated with a first user 220 over communication network 208, who has navigated to the website using a web browser on the first user device 218. Such a prediction can be done using machine learning techniques by the fast path model. In further embodiments, the bias mitigation server 202 can obtain additional data that can include the content of the advertisement and the content of the website hosted by the web server 210. For example, the content of the advertisement may pertain to beer, while the website is intended for children. The bias mitigation server 202 can implement a slow path model during the first time period that shadows the fast path model to determine whether to provide the advertisement to the web server 210 according to the input data (bids) and the additional data (content of advertisement and content of website) based on the slow path model. In the example above, the slow path model may determine that the beer advertisement should not be provided to the web server 210 to be presented on a website aimed at kids since a beer advertisement is inappropriate for children. Such a prediction can be done using machine learning techniques by the slow path model.

In one or more embodiments, the content of the advertisement and the content of the website can be determined using image recognition techniques utilized by the bias mitigation server 202, or by any other network node and provided to the bias mitigation server 202. In other embodiments, any content of input data provided to the bias mitigation server 202 can be determined using image recognition techniques, voice recognition techniques, textual analytics, etc.

In one or more embodiments, the bias mitigation server 202, after termination of the first time period, retrains the fast path model according to its input data and prediction during the first time period resulting in a retrained fast path model. Further, the bias mitigation server 202, after termination of the first time period, trains the slow path model according to its prediction during the first time period resulting in a trained slow path model. In additional embodiments, the bias mitigation server 202 can determine a fast path negative impact metric according to the retrained fast path model and determine a slow path negative impact metric according to the trained slow path model. A negative impact metric can be a measure (e.g., a numeric score) of negative impact of posting an inappropriate advertisement for a particular website, for example. In some embodiments, the bias mitigation server 202 determines the fast path negative impact metric exceeds a threshold and determines the slow path negative impact metric does not exceed the threshold. For example, a negative impact metric can range from 0 to 10, with 10 having a significant negative impact. The bias mitigation server 202 can have a threshold of 6, such that any negative impact metric that exceeds a score of 6, exceeds the threshold. Any negative impact metric that does not exceed a score of 6, does not exceed the threshold. In further embodiments, in response to a determination that the fast path negative impact metric exceeds the threshold and a determination that the slow path negative impact metric does not exceed the threshold, the bias mitigation server 202 replaces the fast path model with the slow path model for a second time period.

In one or more embodiments, the bias mitigation server 202 can receive a social media post from a social media server 212 over communication network 208 while also receiving input data in the form of content rules regarding the social media post. The content rules can include checking the social media post for profane content, content directed to threats of violence, or other offensive content. Further, the bias mitigation server 202 can implement a fast path model during a first time period (e.g., day, portion of a day, hour, etc.) to determine to provide the social media post to the first user device 218 to be presented to the first user according to the input data (content rules) based on the fast path model. The first user 220 can be a social media user that consumes social media content on the social media platform hosted by social media server 212. Such a prediction can be done using machine learning techniques by the fast path model. In further embodiments, the bias mitigation server 202 can obtain additional data such as the content of the social media post and user profile for the first user from the first user device 218. For example, the content of the social media post can be directed to sports but the user profile for the first user indicates that the first user dislikes sports. The bias mitigation server 202 can implement a slow path model during the first time period that shadows the fast path model to determine whether to provide the social media post to the first user device 218 to be presented to the first user 220 according to the input data (content rules) and the additional data (content of social media post and user profile) based on the slow path model. In the example above, the slow path model may determine that the social media post should not be provided to the first user device 218 to be presented to the first user. Such a prediction can be done using machine learning techniques by the slow path model.

In one or more embodiments, the bias mitigation server 202, after termination of the first time period, retrains the fast path model according to its input data and prediction during the first time period resulting in a retrained fast path model. Further, the bias mitigation server 202, after termination of the first time period, trains the slow path model according to its prediction during the first time period resulting in a trained slow path model. In additional embodiments, the bias mitigation server 202 can determine a fast path negative impact metric according to the retrained fast path model and a slow path negative impact metric according to the trained slow path model. A negative impact metric can be a measure (e.g., a numeric score) of negative impact of providing a social media post directed to sports to the first user whose user profile clearly indicates a dislike for sports, for example. In some embodiments, the bias mitigation server 202 determines the fast path negative impact metric exceeds a threshold and determines the slow path negative impact metric does not exceed the threshold. In further embodiments, in response to a determination of the fast path negative impact metric exceeding the threshold and a determination of the slow path negative impact metric not exceeding the threshold, the bias mitigation server 202 replaces the fast path model with the slow path model for a second time period. This example is described with respect to content in a social network environment, but the exemplary embodiments described herein are directed to various environments that are not limited to social media environments.

In one or more embodiments, the bias mitigation server 202 can receive captured images from a security camera of a premises via a security server (not shown) over the communication network 206 while also receiving input data in the form of images of people comprising the household of the premises. Further, the bias mitigation server 202 can implement a fast path model during a first time period (e.g., day, portion of a day, hour, etc.) to determine whether to provide any images captured by the security camera of the premises that may be perceived as a security risk to the first user device 218 to be presented to the first user 220 according to the input data (images) based on the fast path model. As a result, the fast path model may choose to provide the images captured by the security camera of the premises to the first user device 218. Further, the bias mitigation server 202 provides the images captured by the security camera of the premises to the first user device 218 accordingly. Such a prediction (e.g., providing the captured images of perceived security threat from the security camera of the premises) can be done using machine learning techniques by the fast path model. In further embodiments, the bias mitigation server 202 can obtain additional data that can include the images of people that visit the premises frequently (e.g., extended family members, caregiver, parcel delivery persons, etc.). The bias mitigation server 202 can implement a slow path model during the first time period that shadows the fast path model to determine whether to provide captured images by the security camera of the premises to the first user device 218 according to the input data (images of people from the household) and the additional data (images of people who frequently visit the premises) based on the slow path model. In the example above, the slow path model may determine that the captured images should not be provided to the first user device 218 because there is no perceived security threat according to the additional data. Such a prediction can be done using machine learning techniques by the slow path model. Further, the determination of whether people in the images captured by the security camera of the premises are images of people of the household or images of people who frequently visit the premises can be performed using image recognition techniques.

In one or more embodiments, the bias mitigation server 202, after termination of the first time period, retrains the fast path model according to its input data and prediction during the first time period resulting in a retrained fast path model. Further, the bias mitigation server 202, after termination of the first time period, trains the slow path model according to its prediction during the first time period resulting in a trained slow path model. In additional embodiments, the bias mitigation server 202 can determine a fast path negative impact metric according to the retrained fast path model and determine a slow path negative impact metric according to the trained slow path model. A negative impact metric can be a measure (e.g., numeric score) of negative impact of providing captured images to the first user device 218 due to perceived security risk but are of images of people who frequently visit the premises, for example. In some embodiments, the bias mitigation server 202 determines the fast path negative impact metric exceeds a threshold and determines the slow path negative impact metric does not exceed the threshold. For example, a negative impact metric can range from 0 to 10, with 10 having a significant negative impact. The bias mitigation server 202 can have a threshold of 6, such that any negative impact metric that exceeds a score of 6, exceeds the threshold. Any negative impact metric that does not exceed a score of 6, does not exceed the threshold. In further embodiments, in response to a determination of the fast path negative impact metric exceeding the threshold and a determination of the slow path negative impact metric not exceeding the threshold, the bias mitigation server 202 replaces the fast path model with the slow path model for a second time period.

In one or more embodiments, some or all of the functions and/or operations of the bias mitigation server 202 can be incorporated in any one or all of the other servers shown FIG. 2A. In some embodiments, some or all of the functions and/or operations of the bias mitigation server 202 can be spread across various servers (not shown in FIG. 2A).

Figure 2B:
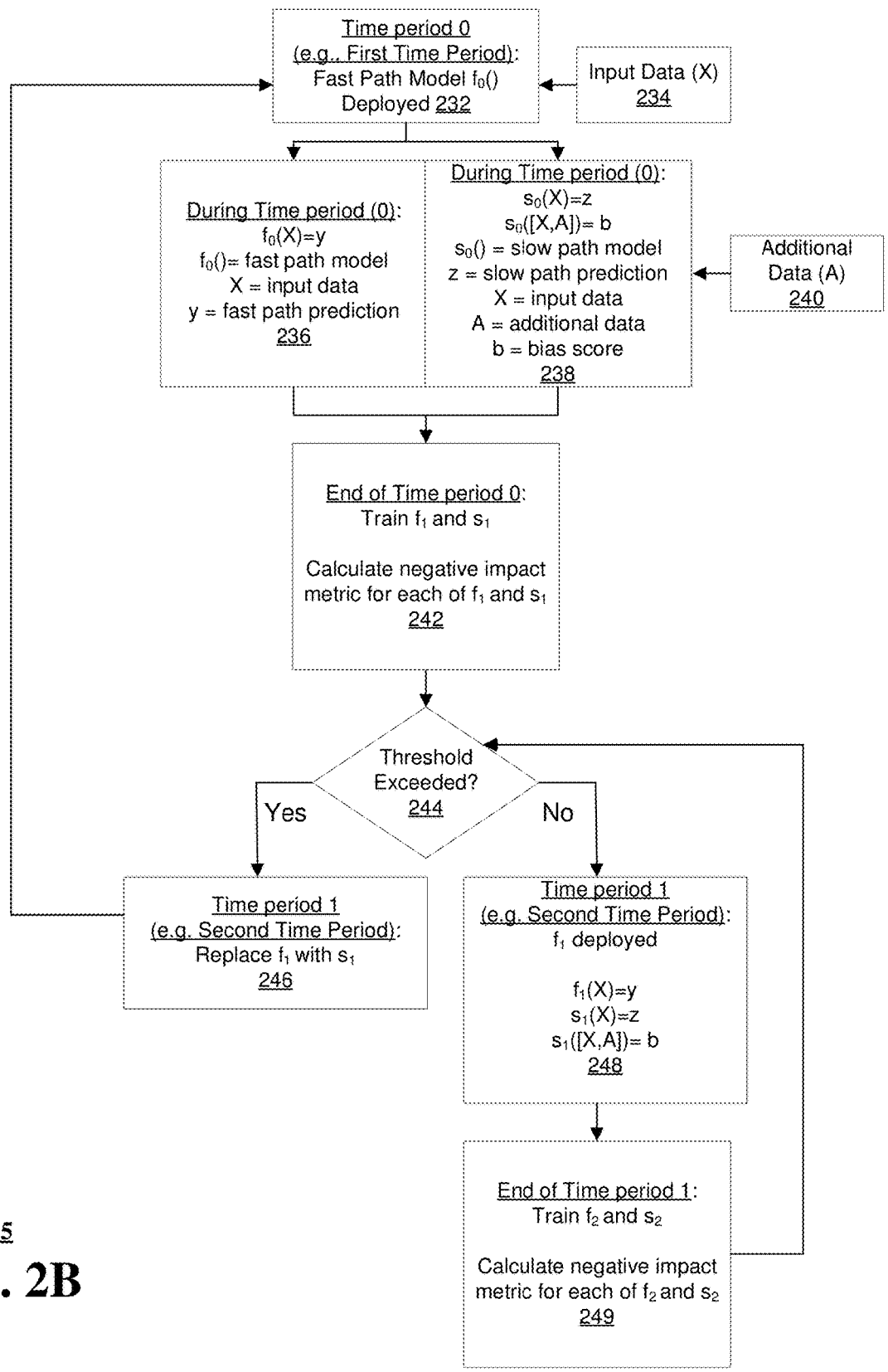
FIGS. 2B-C depict illustrative embodiments of methods in accordance with various aspects described herein.
Figure 2C:
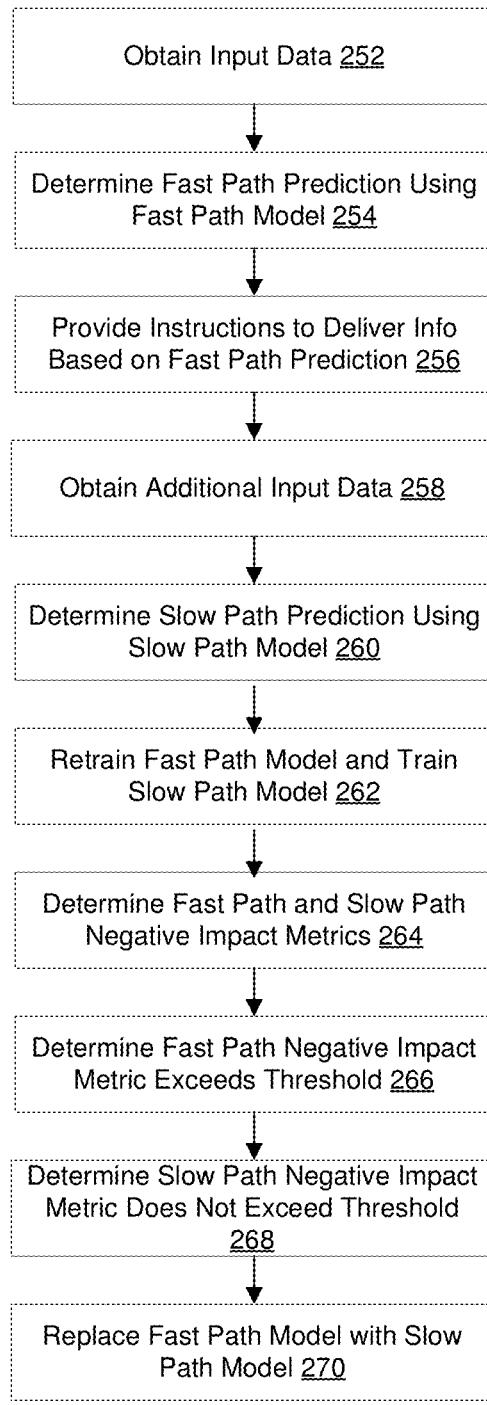

FIGS. 2B-C depict illustrative embodiments of methods in accordance with various aspects described herein. In one or more embodiments, referring to FIG. 2B, method 225 illustrates the details of a slow path model working in parallel with a fast path model to mitigate potential bias in posting information on the Internet. Aspects of method 225 can be implemented by a bias mitigation server as shown in FIG. 2A. The fast path model is retrained and reevaluated at the end of each time period to be made ready for deployment the next time period. In some embodiments, the time period can be one day or 24-hour period. However, in other embodiments, a time period can be any unit of time that represents the regular period in the train-deploy-retrain-redeploy cycle (e.g., day, 12-hour period, 8-hour period, 4-hour period, etc.).

In one or more embodiments, method 225 can include the bias mitigation server, at 232, deploying the fast path model $f_0(\ )$, as is. Also, the method 225 can include the bias mitigation server, at 234, obtaining Input Data X, at 236, and implementing fast path model, $f_0(X)=y$, where y is the prediction to post information on the Internet made by the fast path model based on input data X. Further, the method 225 can include the bias mitigation server, at 240 obtaining additional data A, and, at 238, implementing the slow path models $s_0(X)=z$ and $s_0([X,A])=b$, where z is the prediction on whether to post information on the Internet based on input data X and b is a bias score based on input data X and additional data A that reflects risk and potential cost of negative impact for suboptimal decisions to post information on the Internet. Note that in this example $s_0(x)$ inherits the prediction of $f_0(x)$ because a separate model has not yet been trained. The bias score might vary depending on a use case. For example, for filtering resumes for an employer, it can be a measure such as disparate impact or true/false positive/negative rates for a particular employment criteria. For a website use case, it can be a measure of how often advertisement/content is placed on brand-unsafe webpages and the opportunity cost of not choosing other safer websites instead. For the use case of evaluation of security risk of the captured images, the bias metric could consider criteria such as visitor/stranger, time of day, etc. in identifying individuals deemed to be a security risk. These bias scores are calculated throughout the day for each decision made by the fast path model and go into the calculation of the final negative impact metric, which is then used to make a decision on whether to replace the fast path model with the slow path model.

The slow path model can be designed to be time period zero bias-aware. That is, it is designed to minimize the costs/negative impact scores and/or other metrics of potential bias it computes from outcomes of the fast path model, $f_0(\ )$. Further, the method 225 can include the bias mitigation server, at 242, retraining fast path model, $f_1(\ )$ at the end of the first time period based on prediction outcomes of the first time period. In addition, the method 225 can include the bias mitigation server, at 242, training a separate slow path model, $s_1(\ )$. Once the fast path model, $f_1(\ )$ is retrained and the slow path model, $s_1(\ )$ is trained, a negative impact metric for each of the fast path model, $f_1(\ )$ and the slow path model, $s_1(\ )$ can be calculated, at 242. The method 225 can include the bias mitigation server, at 244, comparing the negative impact metric for fast path model, $f_1(\ )$ and the negative impact metric for the slow path model, $s_1(\ )$ accrued if fast path model, $f_1(\ )$ is deployed during the second time period instead of the slow path model, $s_1(\ )$ This represents a trade-off analysis of accuracy vs. cost, and if the negative impact metric for the fast path model, $f_1(\ )$ exceeds some pre-specified threshold, the decision can be made to deploy slow path model, $s_1(\ )$, in place of fast path model, $f_1(\ )$ Thus, if the pre-specified threshold is exceeded, the method 225 can include the bias mitigation server, at 246, replacing fast path model, $f_1(\ )$ with slow path model, $s_1(\ )$. The slow path model, $s_1(\ )$ is deployed as the fast path model, $f_1(\ )$ Additional data can be collected as before through the time period as in the first time period. However, if the pre-specified threshold is not exceeded, the method 225 can include the bias mitigation server, at 248, deploying the fast path model, $f_1(\ )$ during the second time period. Further, the slow path model, $s_1(\ )$ can also be run by the mitigation server in parallel with a slight lag necessary to collect additional data while making decisions on input data. At runtime, if significant accumulation of cost/negative impact metric or bias score happens, an executive decision can be made by a person (e.g., data scientist or project manager of the machine learning project) monitoring the bias mitigation server for the negative impact metric and/or bias score, to replace fast path model, $f_1(\ )$ with slow path model, $s_1(\ )$. However, such real-time replacing can be costly and should be deployed only in the rarest of occasions when the potential penalty of not replacing becomes too high. The method 225 can include the bias mitigation server, at 249, at the end of the second time period, retraining fast path model, $f_2(\ )$ and slow path model, $s_2(\ )$. Similar decisions to replace or not are taken as such decisions were made at the end of the first time period.

Embodiments provide a way to incorporate data external to the process (e.g., implementation of fast path model/slow path model), calculation of metrics, and implementation of bias aware machine learning techniques into fast moving machine learning pipelines with extremely low latency. Moreover, embodiments' addendum of additional information regarding potential cost provides a way to intervene at suitable steps in the pipeline in order to minimize potential future penalties while inflicting minimal disruption on the actual business process.

Further embodiments can include different machine learning algorithms that address different aspects of possible biases, while other embodiments provide a systematic way to incorporate potential bias detection and mitigation in a running machine learning pipeline. While algorithms are developed daily, their training and deployment is not always scalable, which is one of the key hindrances in their deployment. Additional embodiments address that concern by allowing for a parallel slow model process that shadows the fast model process and gradually update the overall process (if need be, through replacement) in terms of better tradeoffs in accurate performance and lower risk of negative impacts and potential costs associated with them.

Additional embodiments have not made any assumptions about the problem domain and/or the machine learning techniques. As such, embodiments are suitable irrespective of any new machine learning techniques that may be developed in the future. Therefore, any new and faster machine learning techniques can be used for the fast path model and/or the slow path model as they are developed. It is highly likely that in the future, new developments in scalable algorithms for bias-aware machine learning models would help make algorithms for the slow path model a better trade-off to a fast path model (in terms of performance accuracy) which would only help make the overall pipeline faster.

Referring to FIG. 2C, in one or more embodiments, the method 250 can be implemented by a bias mitigation server (as shown in FIG. 2A), as described herein. The method 250 can include the bias mitigation server, at 252, obtaining input data. The input data can be obtained from a variety of sources including one or more web servers, advertisement servers, social media servers, employment servers, security servers for a premises, security cameras of a premises, search engine servers, user devices, etc. Further, the method 250 can include the bias mitigation server, at 254, making a determination of a fast path prediction for a first time period according to the input data based on a fast path model. In addition, the method 250 can include the bias mitigation server, at 256, providing instructions to deliver information to a first user device according to the fast path prediction. Also, the method 250 can include the bias mitigation server, at 258, obtaining additional input data. The additional input data can be obtained from various sources that can include the sources that provided the input data. Further, the additional input data can include advertisement content information, website content information, user profile of social media users, demographic information of applicant job pool, demographic information of educational institutions associated with applicants, etc. In addition, the method 250 can include the bias mitigation server, at 260, making a determination of a slow path prediction for the first time period according to the input data and the additional input data based on a slow path model.

In one or more embodiments, the method 250 can include the bias mitigation server, at 262, retraining the fast path model according to the input data and fast path prediction resulting in a retrained fast path model and training the slow path model according to the slow path prediction resulting in a trained slow path model. Further, the method 250 can include the bias mitigation server, at 264, making a determination of a fast path negative impact metric according to the retrained fast path model and a determination of a slow path negative impact metric according to the trained slow path model. In addition, the method 250 can include the bias mitigation server, at 266, making a determination that the fast path negative impact metric exceeds a threshold, and, at 268, making a determination that the slow path negative impact metric does not exceed the threshold. Also, the method 250 can include the bias mitigation server, at 270, replacing the fast path model with the slow path model. In some embodiments, the replacing of the fast path model with the slow path model comprises replacing the fast path model with the slow path model for a second time period. In some embodiments, the replacing of the fast path model with the slow path model can be in response to the first negative metric exceeding the threshold and the slow path negative impact metric not exceeding the threshold.

In one or more embodiments, the determination of the fast path prediction comprises a determination of the fast path prediction for the first time period according to the input data based on the fast path model using machine learning. Further, a determination of the slow path prediction comprises a determination of the slow path prediction for the first time period according to the input data based on the slow path model using machine learning.

In one or more embodiments, the obtaining of the input data comprises obtaining first website information and the determination of the fast path prediction comprises a determination of the fast path prediction according to the first website information. Further, the obtaining of the additional input data comprises obtaining second website information. The determination of the slow path prediction comprises a determination the slow path prediction according to the first website information and the second website information.

In one or more embodiments, the fast path prediction comprises a prediction to post an advertisement on a website, and the slow path prediction comprises a prediction not to post the advertisement on the website. In further embodiments, the fast path prediction comprises a prediction to place a social media post on a social media feed of a user, and the slow path prediction comprises a prediction not to place the social media post on the social media feed of the user. In additional embodiments, the fast path prediction comprises a prediction not to send a resume to an employer, and the slow path prediction comprises a prediction to send the resume to the employer (so as not to limit the applicant pool).

In one or more embodiments, the additional input data can vary over time. Further embodiments can include the additional input data being provided or obtained at random intervals. Additional embodiments can include having a different threshold for potential bias concerns that can depend on obtaining the additional input data at random intervals and/or the additional input data being varied over time. In further embodiments, a threshold can be adjusted based on an obtained parameter. The parameter can include, but is not limited to, a cost of retraining, time for retraining, frequency of retraining, a variation of the threshold that triggers retraining, tracking input data changes and retraining on the basis of a rate of change of input data, a threshold for varying based on an application, a threshold based on a group of actions or a combination thereof. Frequency of retraining can be, for example, daily, hourly, every 15 minutes, etc. Time of the retraining can be, for example, 8 am, 12 noon, 3 pm, 9 pm, midnight, etc. A threshold that can vary based on an application can be, for example, 20 million advertisements that have been processed, 1 million distinct Websites that had advertisements matched to them, or 500,000 advertisements that were seen within one hour. Each of these thresholds can be varied, and when such a threshold is exceeded, retraining is automatically retriggered. In some embodiments, there may be a threshold for the number of advertisement that are matched to a particular type of Website (e.g., children websites, sports website, etc.). Such input data could trigger retraining.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, portions of embodiments described herein can be combined with other portions of embodiments described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and methods 225, 250 presented in FIGS. 1, 2A, 2B, 2C, and 3. For example, virtualized communication network 300 can facilitate in whole or in part in detecting and mitigating potential bias that includes a determination that a fast path negative impact metric based on a fast path prediction using a fast path model exceeds a threshold during a first time period, and a determination that a slow path negative impact metric based on a slow path prediction using a slow path model does not exceed the threshold during the first time period such that the slow path model replaces the fast path model during a second time period.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
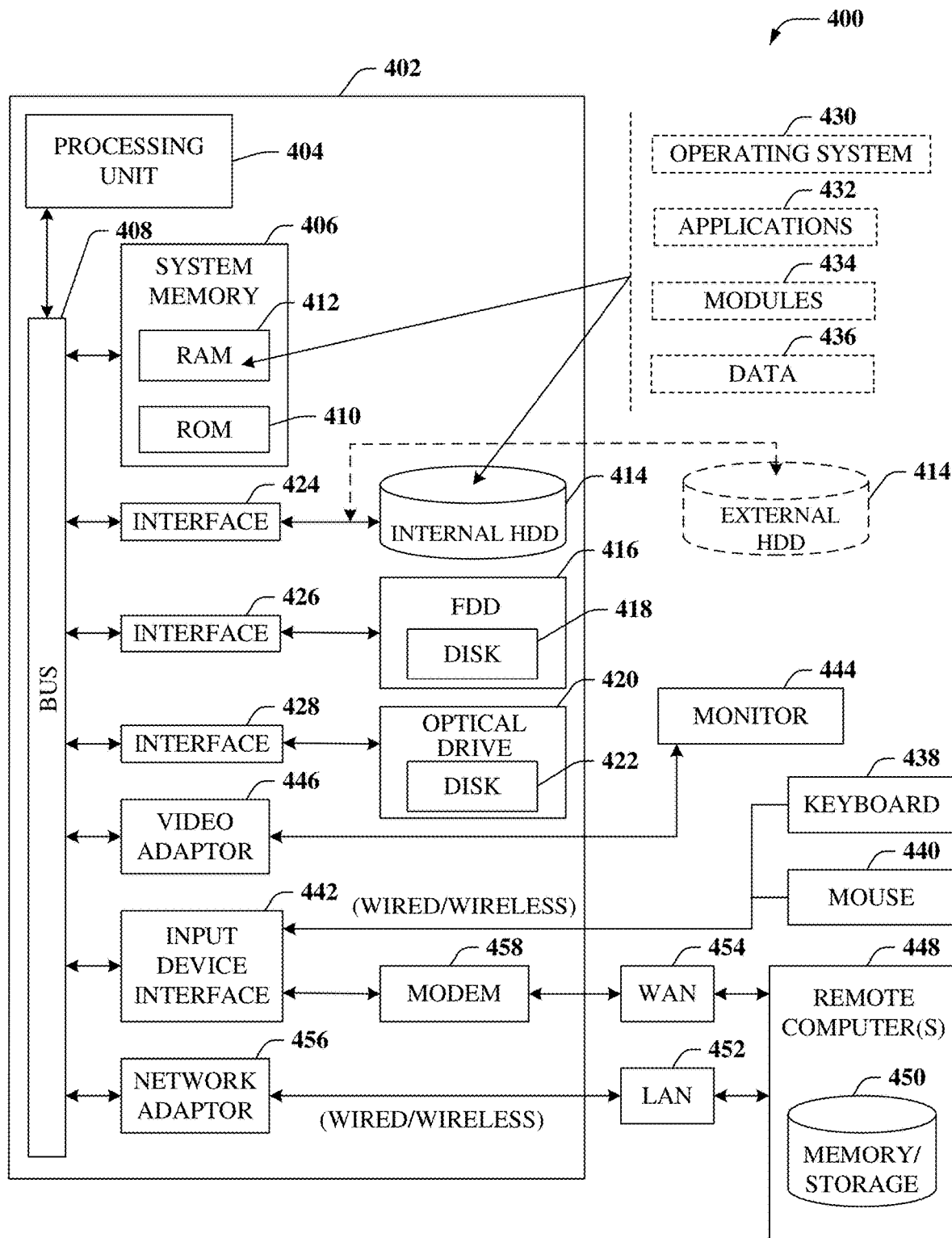
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part in detecting and mitigating potential bias that includes a determination that a fast path negative impact metric based on a fast path prediction using a fast path model exceeds a threshold during a first time period, and a determination that a slow path negative impact metric based on a slow path prediction using a slow path model does not exceed the threshold during the first time period such that the slow path model replaces the fast path model during a second time period. Further, servers 202, 210, 212, 214, 216, and user device 218, (all of which are shown in FIG. 2A) can comprise the computing environment 400. Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refer to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
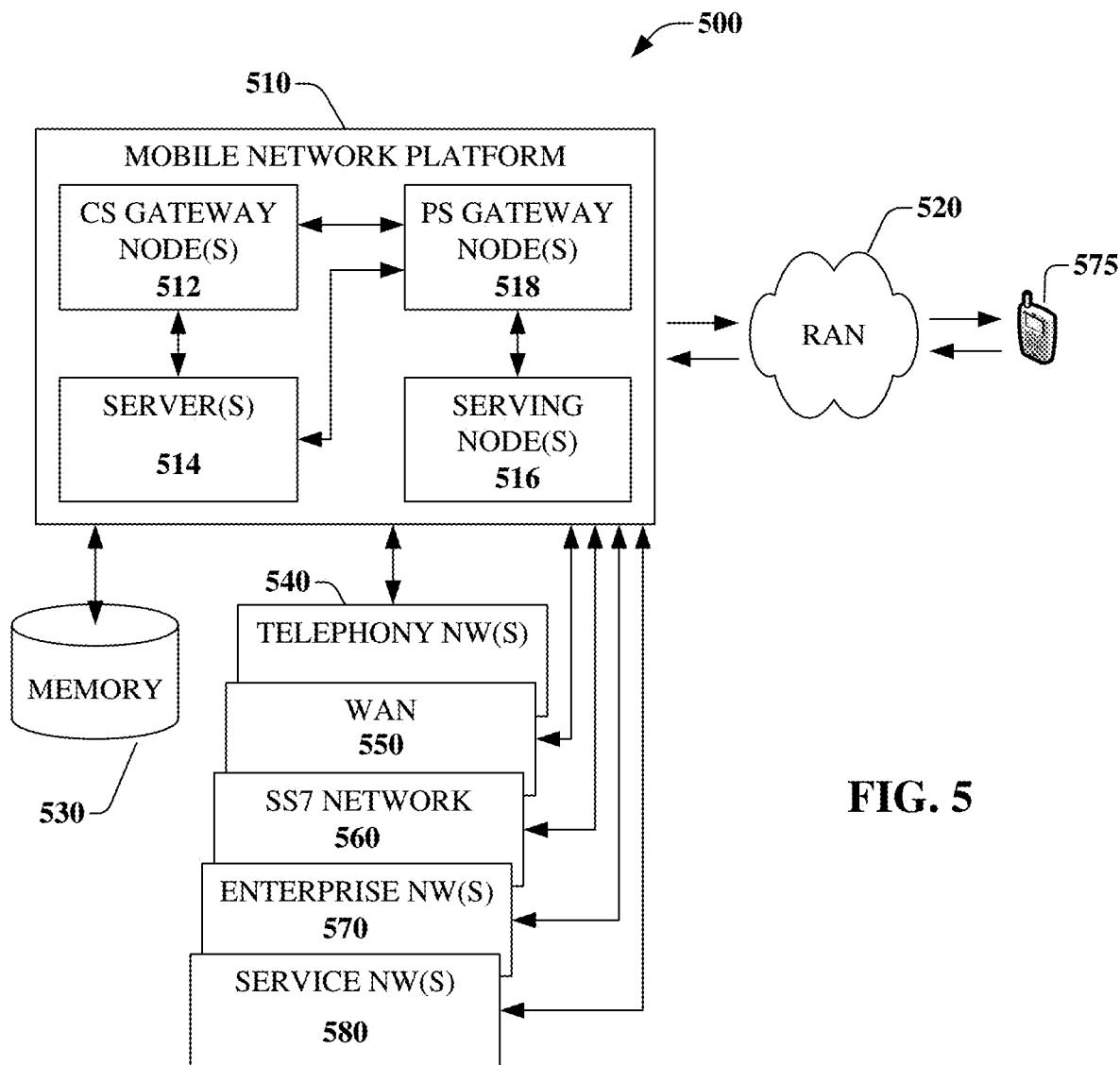
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part in detecting and mitigating potential bias that includes a determination that a fast path negative impact metric based on a fast path prediction using a fast path model exceeds a threshold during a first time period, and a determination that a slow path negative impact metric based on a slow path prediction using a slow path model does not exceed the threshold during the first time period such that the slow path model replaces the fast path model during a second time period. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1($s$) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
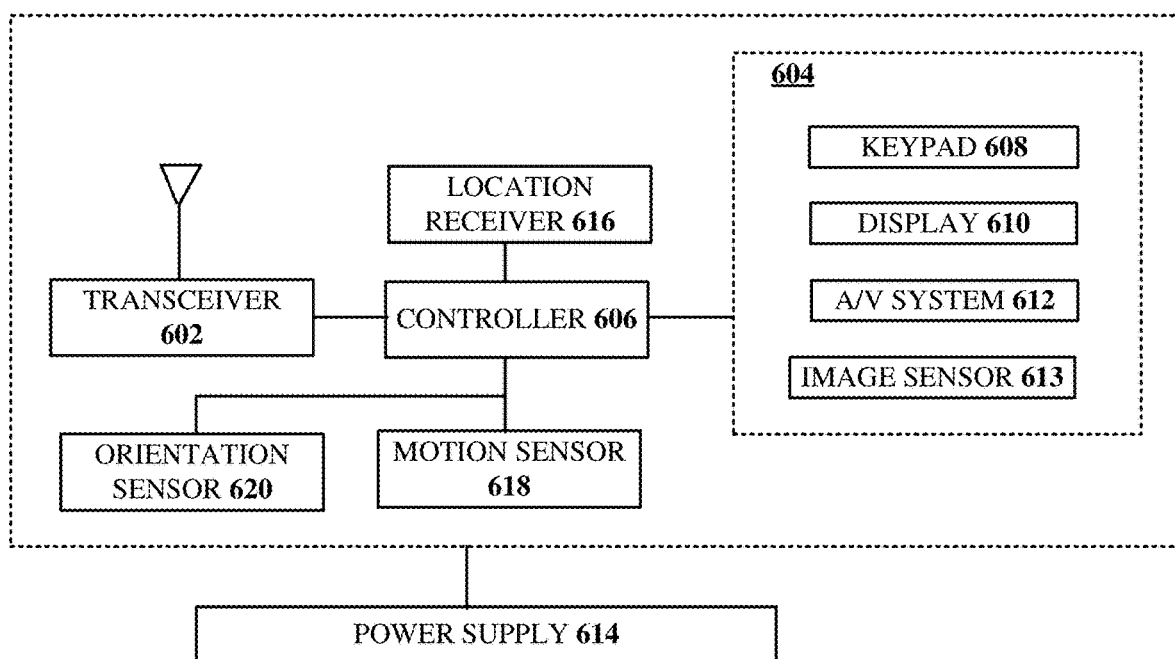
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part in detecting and mitigating potential bias that includes a determination that a fast path negative impact metric based on a fast path prediction using a fast path model exceeds a threshold during a first time period, and a determination that a slow path negative impact metric based on a slow path prediction using a slow path model does not exceed the threshold during the first time period such that the slow path model replaces the fast path model during a second time period. Further, servers 202, 210, 212, 214, 216, and user device 218, (all of which are shown in FIG. 2A) can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands-free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ machine learning (ML) to facilitate automating one or more features described herein. The embodiments can employ various ML-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistically-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split in order to separate the inputs with the triggering criteria from those with the non-triggering events. Intuitively, this makes the classification correct for testing data that is near, but not identical to training data. Other supervised and unsupervised model classification approaches that comprise, e.g., naïve Bayes, Bayesian networks, decision trees, neural networks, fuzzy logic models, and probabilistic classification models, providing different patterns of independence, can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the words "example" or "exemplary" is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through machine learning (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining input data from a server;
   determining a fast path prediction for a first time period according to the input data based on a fast path model resulting in a determination of the fast path prediction;
   providing instructions to deliver information to a first user device according to the fast path prediction;
   obtaining additional input data from the server;
   determining a slow path prediction for the first time period according to the input data and the additional input data based on a slow path model resulting in a determination of the slow path prediction;
   retraining the fast path model according to the input data and the fast path prediction;
   training the slow path model according to the slow path prediction; and
   determining a fast path negative impact metric according to the retrained fast path model resulting in a determination of the fast path negative impact metric and determining a slow path negative impact metric according to the trained slow path model resulting in a determination of the slow path negative impact metric, wherein the fast path negative impact metric is associated with a quality metric associated with content hosted on the server, wherein the slow path negative impact metric is associated with the quality metric associated with the content.

2. The device of claim 1, wherein the operations further comprise:
   determining the fast path negative impact metric exceeds a threshold; and
   determining the slow path negative impact metric does not exceed the threshold.

3. The device of claim 2, wherein the operations further comprise replacing the fast path model with the slow path model in response to the fast path negative impact metric exceeding the threshold and the slow path negative impact metric not exceeding the threshold.

4. The device of claim 3, wherein the replacing of the fast path model with the slow path model comprises replacing the fast path model with the slow path model for a second time period.

5. The device of claim 1, wherein the operations comprise:
   determining the fast path negative impact metric does not exceed a threshold;
   obtaining second input data from the server;
   determining a second fast path prediction for a second time period according to the second input data based on the fast path model resulting in a second determination of the fast path prediction;
   providing second instructions to deliver information to the first user device according to the second fast path prediction;
   obtaining second additional input data from the server;
   determining a second slow path prediction for the second time period according to the second input data and the second additional input data based on the slow path model resulting in a second determination of the slow path prediction;
   retraining the fast path model according to the second input data and the second fast path prediction;
   retraining the slow path model according to the input data, second input data, additional input data, second additional input data, the slow path prediction, and the second slow path prediction;
   determining a second fast path negative impact metric according to the retrained fast path model resulting in a second determination of the second fast path negative impact metric and determining a second slow path negative impact metric according to the retrained slow path model resulting in a second determination of the second slow path negative impact metric, wherein the second fast path negative impact metric is associated with the quality metric associated with the content, wherein the second slow path negative impact metric is associated with the quality metric associated with the content; and
   replacing the fast path model with the slow path model in response to the second fast path negative impact metric exceeding the threshold and the second slow path negative impact metric not exceeding the threshold.

6. The device of claim 1, wherein the determination of the fast path prediction comprises a determination of the fast path prediction for the first time period according to the input data based on the fast path model using machine learning, wherein the determination of the slow path prediction comprises a determination of the slow path prediction for the first time period according to the input data based on the slow path model using the machine learning.

7. The device of claim 1, wherein the obtaining of the input data comprises obtaining first website information, wherein the determination of the fast path prediction comprises a determination of the fast path prediction according to the first website information, wherein obtaining of the additional input data comprises obtaining second website information, wherein the determination of the slow path prediction comprises a determination of the slow path prediction according to the first website information and the second website information.

8. The device of claim 1, wherein the fast path prediction comprises predicting to post an advertisement on a website, wherein the slow path prediction comprises predicting not to post the advertisement on the website.

9. The device of claim 1, wherein the fast path prediction comprises predicting to place a social media post on a social media feed of a user, wherein the slow path prediction comprises predicting not to place the social media post on the social media feed of the user.

10. The device of claim 1, wherein the server comprises at least one of a web server, an advertisement server, a social media server, an employment server, a security server, a search engine server, or any combination thereof.

11. A non-transitory, machine-readable medium, comprising executable instructions that, when executed by a processing system including a processor, facilitate performance of operations, the operations comprising:
obtaining input data from a server;
determining to post an advertisement on a website associated with the server for a first time period according to the input data based on a fast path model resulting in a determination of posting the advertisement;
providing instructions to deliver information to a user device according to the determination of posting the advertisement;
obtaining additional input data from the server;
determining not to post the advertisement on the website for the first time period according to the input data and the additional input data based on a slow path model resulting in a determination of not posting the advertisement;
retraining the fast path model according to the determination of posting the advertisement;
training the slow path model according to the determination of not posting the advertisement; and
determining a fast path negative impact metric according to the retrained fast path model resulting in a determination of the fast path negative impact metric and determining a slow path negative impact metric according to the trained slow path model resulting in a determination of the slow path negative impact metric, wherein the fast path negative impact metric is associated with a quality metric associated with the website hosted on a web server, wherein the slow path negative impact metric is associated with the quality metric associated with the website.

12. The non-transitory, machine-readable medium of claim 11, wherein the operations further comprise:
determining the fast path negative impact metric exceeds a threshold; and
determining the slow path negative impact metric does not exceed the threshold.

13. The non-transitory, machine-readable medium of claim 12, wherein the operations further comprise replacing the fast path model with the slow path model.

14. The non-transitory, machine-readable medium of claim 13, wherein the replacing of the fast path model with the slow path model comprises replacing the fast path model with the slow path model for a second time period.

15. The non-transitory, machine-readable medium of claim 11, wherein the determination of posting the advertisement comprises a determination to post the advertisement for the first time period according to the input data based on the fast path model using machine learning.

16. The non-transitory, machine-readable medium of claim 15, wherein the determination of not posting the advertisement comprises a determination not to post the advertisement for the first time period according to the input data based on the slow path model using the machine learning.

17. A method, comprising:
obtaining, by a processing system including a processor, input data from a server;
determining, by the processing system, a fast path prediction for a first time period according to the input data based on a fast path model resulting in a determination of the fast path prediction;
providing, by the processing system, instructions to deliver information to a user device according to the fast path prediction;
obtaining, by the processing system, additional input data from the server;
determining, by the processing system, a slow path prediction for the first time period according to the input data and the additional input data based on a slow path model resulting in a determination of the slow path prediction;
retraining, by the processing system, the fast path model according to the fast path prediction resulting in a retrained fast path model;
training, by the processing system, the slow path model according to the slow path prediction resulting in a trained slow path model;
determining, by the processing system, a fast path negative impact metric according to the retrained fast path model resulting in a determination of the fast path negative impact metric and determining by the processing system, a slow path negative impact metric according to the trained slow path model resulting in a determination of the slow path negative impact metric wherein the fast path negative impact metric is associated with a quality metric associated with content hosted on a web server, wherein the slow path negative impact metric is associated with the quality metric associated with the content;
determining by the processing system, the fast path negative impact metric exceeds a first threshold;
determining by the processing system, the slow path negative impact metric does not exceed the first threshold; and
replacing, by the processing system, the fast path model with the slow path model.

18. The method of claim 17, wherein the replacing of the fast path model with the slow path model comprises replacing, by the processing system, the fast path model with the slow path model for a second time period.

19. The method of claim 17, comprising adjusting, by the processing system, the first threshold in response to obtaining, by the processing system, a parameter.

20. The method of claim 19, wherein the parameter includes one of a cost of the retraining, a time of the retraining, a frequency of the retraining, a variation of the first threshold that triggers the retraining, tracking input data changes and retraining on a basis of a rate of change of input data, a second threshold varying based on an application, a third threshold based on a group of actions, or any combination thereof.

\* \* \* \* \*